(12) United States Patent
Smith et al.

(10) Patent No.: US 6,347,624 B1
(45) Date of Patent: Feb. 19, 2002

(54) TILE SAW

(75) Inventors: John Charles Smith, Jackson; Ginger Lea Allen, Medina; Thomas O'Neal Walls, Cedar Grove; Michael Chad Hollis, Huron; Waymon Louis McNeal, Jr., Jackson, all of TN (US)

(73) Assignee: Porter-Cable/Delta, Jackson, TN (US)

( * ) Notice: Subject to any disclaimer, the term of this patent is extended or adjusted under 35 U.S.C. 154(b) by 0 days.

(21) Appl. No.: 09/714,134

(22) Filed: Nov. 17, 2000

(51) Int. Cl.$^7$ .............................................. B28D 1/04
(52) U.S. Cl. ...................... 125/13.01; 125/35; 451/360
(58) Field of Search ............................ 125/13.01, 13.02, 125/14, 12, 35; 451/360, 361, 362, 363, 342

(56) References Cited

U.S. PATENT DOCUMENTS

| | | | |
|---|---|---|---|
| 4,428,159 A | * 1/1984 | Sigetich et al. | ............. 51/92 R |
| 5,676,124 A | 10/1997 | Lee | |
| RE35,666 E | 11/1997 | Smith | |
| 6,000,387 A | 12/1999 | Lee | |
| 6,080,041 A | 6/2000 | Greenland | |
| 6,119,676 A | 9/2000 | Greenland | |
| 6,152,127 A | * 11/2000 | Fuhrman et al. | ............... 125/35 |
| 6,263,866 B1 | * 7/2001 | Tsao | ........................ 125/13.01 |

FOREIGN PATENT DOCUMENTS

| | | |
|---|---|---|
| EP | 1 000 720 A2 | 5/2000 |
| JP | 11-123611 | 5/1999 |

OTHER PUBLICATIONS

Advertisement featuring VX2.1 Tile Saw from Pearl Abrasive Co.
Advertisement featuring MK Diamond Products' MK–370, MK–101, MK–770, MK–1080, MK–660, and MK–880 tile saws, 1999.
MK 370 Tile Saw Owner's Manual Parts Listing & Operating Instructions, Manual Part No. 156760, Revision 7/98.
Pearl Abrasive Co. VX Tile Saw Stand Instruction Sheet, Revision 2/99.
Advertisement featuring MK Diamond Products' Tools & Accessories including the MK–ATS Stand, 1998.

* cited by examiner

*Primary Examiner*—Joseph J. Hail, III
*Assistant Examiner*—Dung Van Nguyen
(74) *Attorney, Agent, or Firm*—Hunton & Williams

(57) ABSTRACT

A tile saw includes a base, a frame supported on the base, a sliding table supported on the frame, an arm mounted to the frame, and a rotary saw mounted to the arm for cutting tile or other masonry products placed on the sliding table. The table includes rollers which ride inside substantially enclosed tracks on the frame. The substantially enclosed tracks prevent fluid from reaching the tracks and the rollers and prevent deposits of sludge from forming on the tracks and rollers and hampering the smooth movement of the sliding table. Also, because the rollers ride in enclosed tracks, the table is stable and does not tip relative to the tile saw. Also, the table can be easily removed from the tile saw when a locking assembly is unlocked. The base includes an integral reservoir and is hollow for increased rigidity. A blade guard pivots to a position to provide access to the saw blade, and includes an improved clamping mechanism.

43 Claims, 14 Drawing Sheets

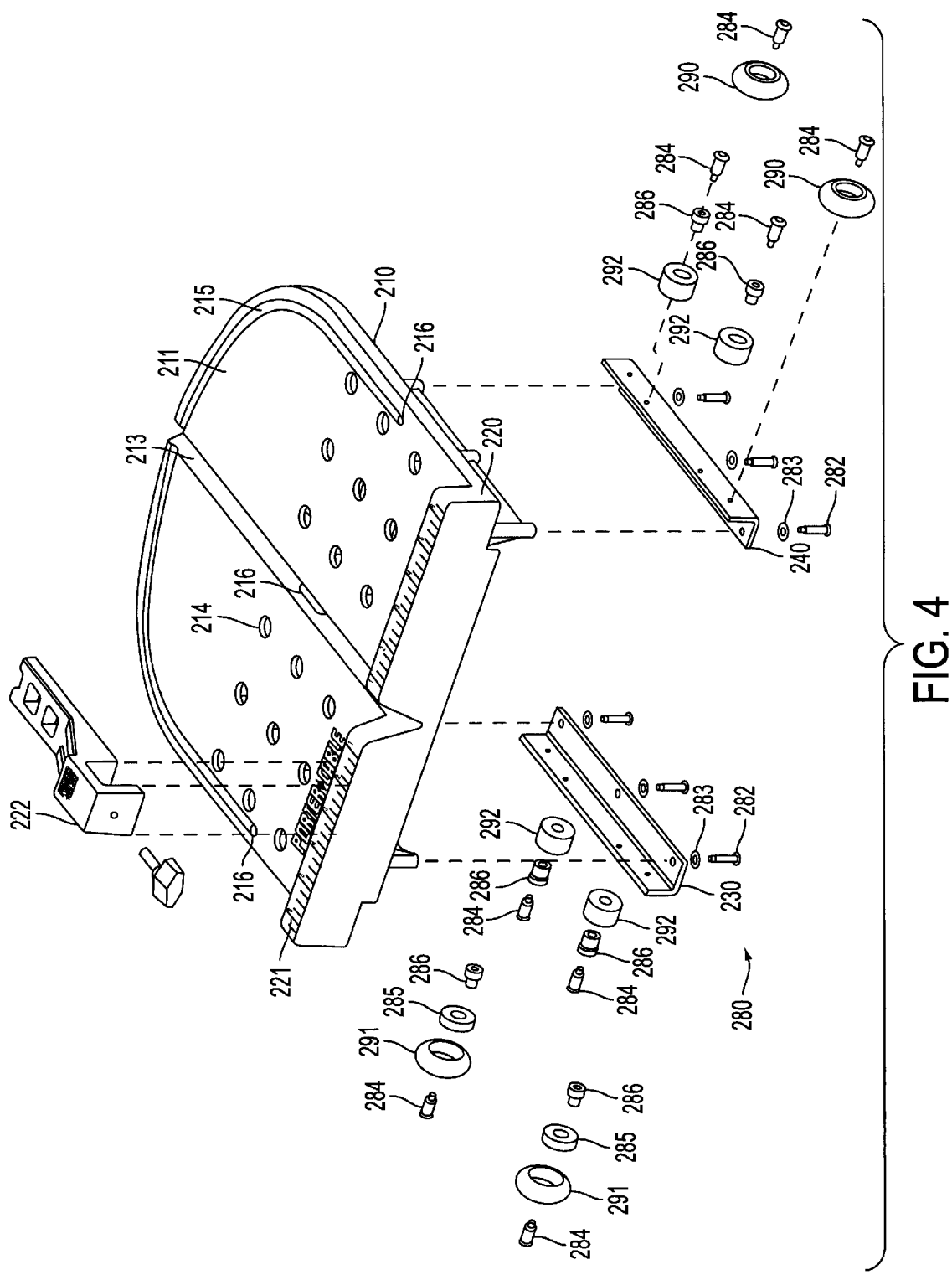

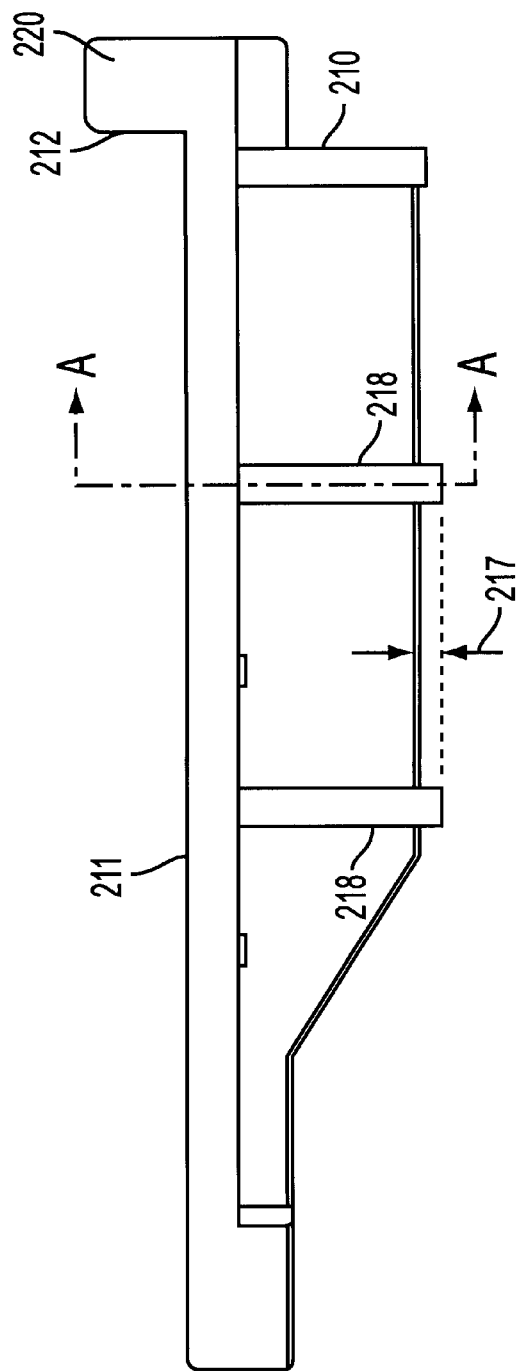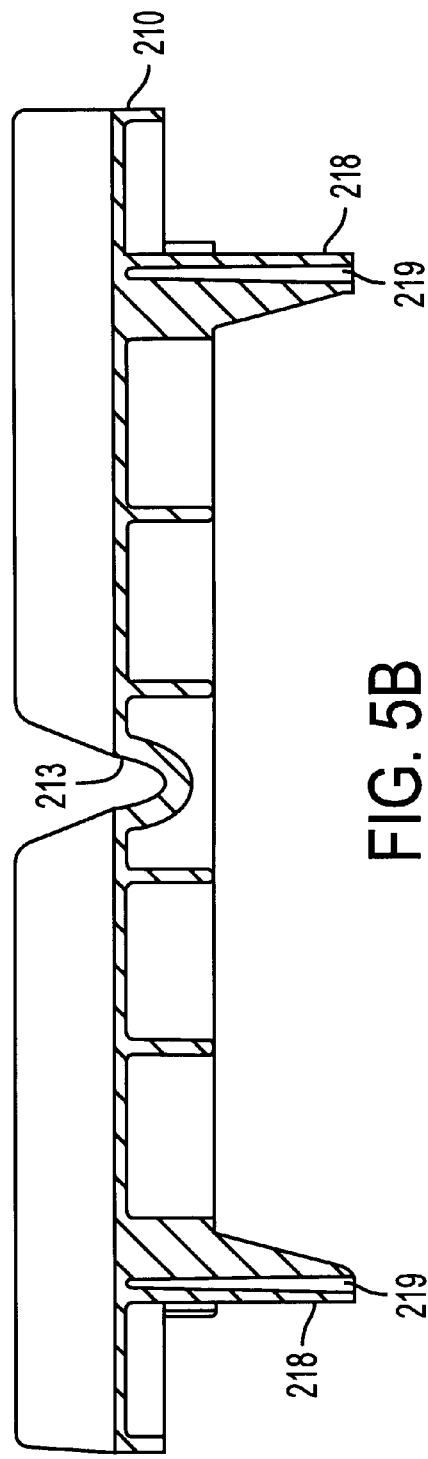
FIG. 5A
FIG. 5B

TILE SAW

BACKGROUND OF THE INVENTION

1. Field of the Invention

This invention relates to the field of saws and in particular to portable, free-standing saws for cutting tile and other masonry products.

2. Description of Related Art

Free-standing tile saws generally include a power operated saw, a sliding table for supporting and moving the work pieces to be cut, and a reservoir for collecting and holding a cooling fluid. Cooling fluid is often used during the cutting of tile and other masonry products to cool the blade and the cut area on the work piece, as well as to suppress dust and wash away the loose particles from the cut area and blade to prevent excess wear of the blade. A pump removes cooling fluid from the reservoir and recirculates the fluid onto the saw blade and cut area on the work piece.

Various limitations have been encountered with known tile saws, including properly handling the cooling fluid as it flows back into the reservoir. In known tile saws, the cooling fluid often flows onto the wheels and frame on which the sliding table is supported. Debris in the cooling fluid can settle on the wheels and frame, leaving an accumulation of sludge. The sludge can hamper the smooth sliding action of the table and make the saw more cumbersome to operate. Safety issues can arise when the table does not slide smoothly. If the force necessary to slide the table is inconsistent due to sludge on the wheels and frame, the table could suddenly and unpredictably lurch forward during use causing the user's hands or arms to contact the saw blade.

In some known tile saws, the sliding table can be unstable. Stability is important for safety and utility reasons. If the table can tip relative to the saw, it may be inadvertently tipped and come into contact with the blade, or the work piece may be thrown by the blade. Also, if the sliding table is unstable during cutting, the cut may not be as precise as is needed.

The ability to separate the sliding table from the saw is an important feature. Removal of the table is desirable in order to clean any sludge which settles on the saw after prolonged use. Removal of the sliding table on known tile saws is sometimes impossible or, at best, cumbersome.

Some known tile saws include reservoirs which may be removed from the saw in order to dispose of the cooling fluid and clean the reservoir. However, these portable reservoirs, while lightweight, are also relatively flimsy and weak and are therefore difficult to handle. Known tile saws have also not adequately provided a safe and convenient way to accommodate the power cord for the pump which is situated in the reservoir.

Several attempts have been made to correct deficiencies such as these. Japanese Patent Application No. 11-123611 discloses a free-standing, portable tile saw having the basic components described previously. This saw is said to provide precision cutting by providing a particular frame and bearing structure. It includes at least one set of rollers which roll on a rail. There is no provision to prevent cooling fluid from settling on the wheels and the rail, so after prolonged use a deposit of sludge may hamper the smooth action of the table. Also, the linear bearing does not appear to permit simple removal of the table from the saw. The reservoir illustrated in the Japanese '611 application appears to include ribs formed in the bottom of the reservoir. However, the reservoir appears to be lacking the rigidity necessary to effectively carry the reservoir when it is filled with fluid. Also, the reservoir in the Japanese '611 application is integral with a base for the rest of the tile saw and the lack of rigidity of the reservoir renders the saw less stable than is desirable.

These and other drawbacks of known tile saws are overcome by the invention as disclosed herein in conjunction with the preferred embodiments.

SUMMARY OF THE INVENTION

It is an object of the preferred embodiments to provide a power operated tile saw with a sliding table which substantially shields the rollers and rails on which the table is supported from cooling fluid.

It is a further object of the preferred embodiments to provide a tile saw having a sliding table that can be conveniently separated from the remainder of the tile saw.

It is an additional object of the preferred embodiments of the invention to provide a tile saw having a sliding table and a locking assembly for selectively preventing the table from being removed from the saw.

It is an additional object of the preferred embodiments of the invention to provide a tile saw having a more rigid reservoir for collecting a fluid.

It is an additional object of the preferred embodiments of the invention to provide a tile saw having a pivoting blade clamp with an improved lock assembly.

These and other objects of the invention are achieved through a tile saw having a base and a frame supported by the base. The frame has a pair of rails with substantially enclosed tracks formed on the rails. A table has a set of rollers which are supported by the rails for sliding movement. An arm supports a saw above the table. The table is supported on the rails such that each of the rollers in the tracks is substantially enclosed. By having the rollers substantially enclosed in the tracks, virtually no fluid will reach the rollers and no deposits of sludge will form around the rollers or in the tracks.

These and other objects of the invention are also achieved by providing a tile saw having a base and a frame supported by the base. The frame has a pair of rails with tracks formed on the rails. A table has a set of rollers which are supported by the rails for sliding movement. An arm supports a saw above the table. The table is supported on the rails such that each of the rollers in the tracks is captured between a top surface and a bottom surface of the rails. By having the rollers captured in the tracks, the table and frame are an integrated, stable unit and the table is not prone to tipping.

These and other objects of the invention are also achieved by providing a tile saw having a base and a frame supported by the base. The frame has a pair of rails. A table has a set of rollers which are supported by the rails for sliding movement. An arm supports a saw above the table. A locking assembly prevents the table from being separated from the rest of the tile saw when the locking assembly is in a locked position.

These and other objects of the invention are also achieved by providing a tile saw having a base and a frame supported by the base. The frame has a pair of rails. A table has a set of rollers which are supported by the rails for sliding movement. An arm supports a saw above the table. A reservoir is positioned beneath the table and has a hollow cavity for increased rigidity.

These and other objects of the invention are also achieved by providing a tile saw having a base and a frame supported by the base. The frame has a pair of rails. A table has a set of rollers which are supported by the rails for sliding movement. An arm supports a saw above the table. A blade guard surrounds a portion of the blade of the saw, and one half of the blade guard is pivotable to provide access to the blade. A locking assembly including a thumbscrew which pivots to engage an aperture in one of the halves of the blade guard locks the blade guard closed.

These and other features, objects, and advantages of the preferred embodiments are apparent through the detailed description of the preferred embodiments in conjunction with the drawings.

BRIEF DESCRIPTION OF DRAWINGS

FIG. 4 is an exploded view of the table assembly of the preferred embodiment;

FIG. 5A is a side view of the table assembly of the preferred embodiment;

FIG. 5B is a sectional view of the table assembly taken along line A—A in FIG. 5A;

DETAILED DESCRIPTION OF THE PREFERRED EMBODIMENTS

Figure 1:
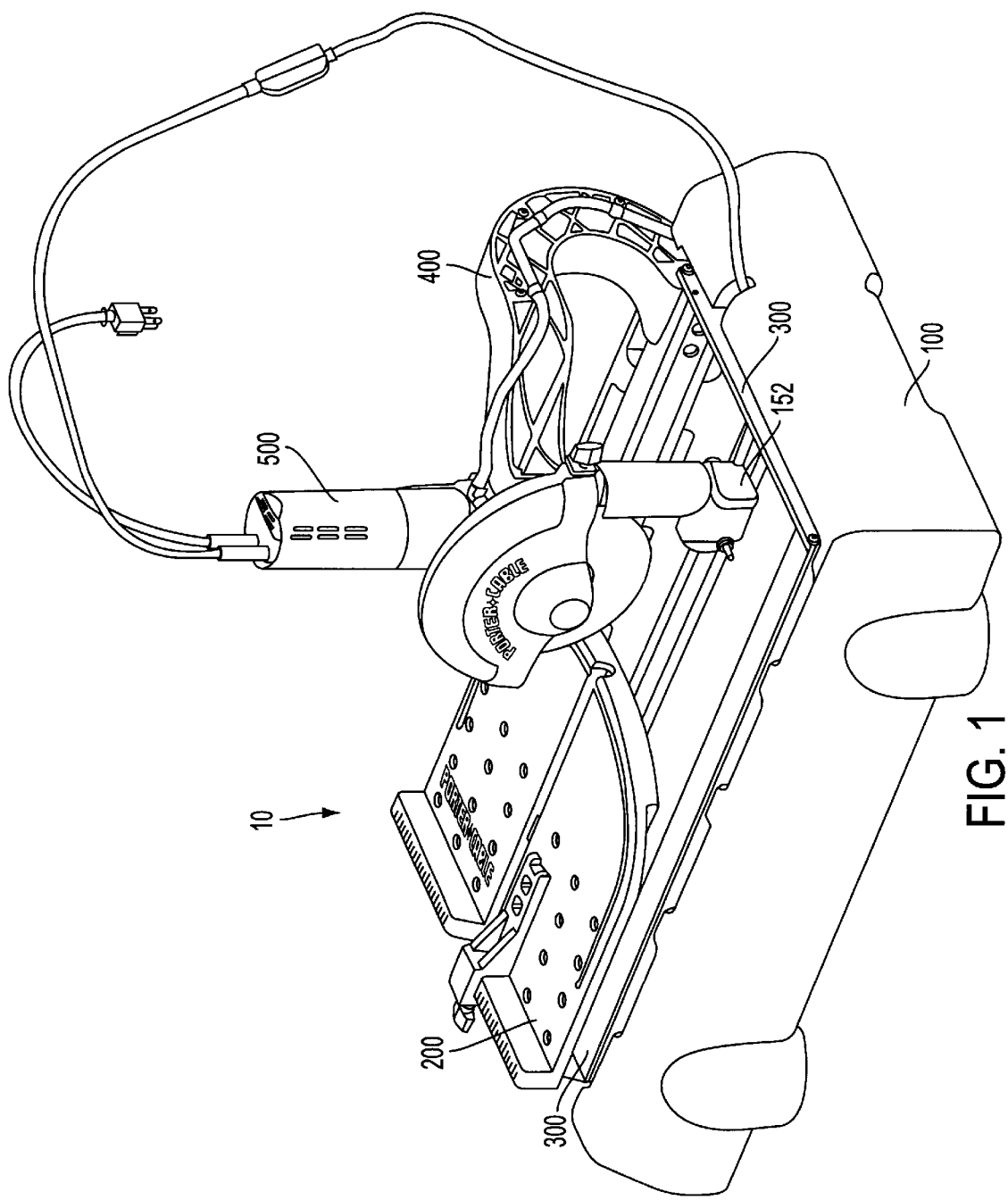
FIG. 1 is a perspective view of the preferred embodiment of the tile saw.

The preferred embodiments of the invention pertain to a portable, free-standing tile saw. Although the invention is described in connection with a particularly preferred arrangement of components, various alternative configurations are also possible. Modifications to the preferred embodiments will be readily apparent to those skilled in the art without departing from the spirit and scope of the invention. Thus, the following description of the preferred embodiments are illustrative only. For convenience, similar elements are designated throughout the drawing figures with the same reference numerals.

With reference to FIG. 1, the tile saw 10 includes a base 100, a table assembly 200, a frame assembly 300, an arm assembly 400, and a saw assembly 500. Each of these assemblies is described in greater detail hereinafter with reference to the remaining figures.

Base 100 provides support for the remaining assemblies and components of the tile saw 10. Base 100 may be a stand with four downwardly extending legs for resting on the ground, or base 100 may be a stand with wheels. Many possible variations of a base 100, which supports the remaining components of tile saw 10, will be apparent to those of skill in the art, and are within the scope of the invention.

In a preferred embodiment, frame assembly 300 rests on top of base 100 during operation of the tile saw 10, and can be easily removed from base 100 when not in use. Base 100 and frame assembly 300 may also be one integral unit. Having the base 100 not permanently attached to the remaining components of the tile saw 10 and, therefore, easily removable, facilitates transporting and cleaning the saw. The arm assembly 400 may be mounted to frame assembly 300, which rests on the base 100, or may be mounted directly to base 100.

Figure 2:
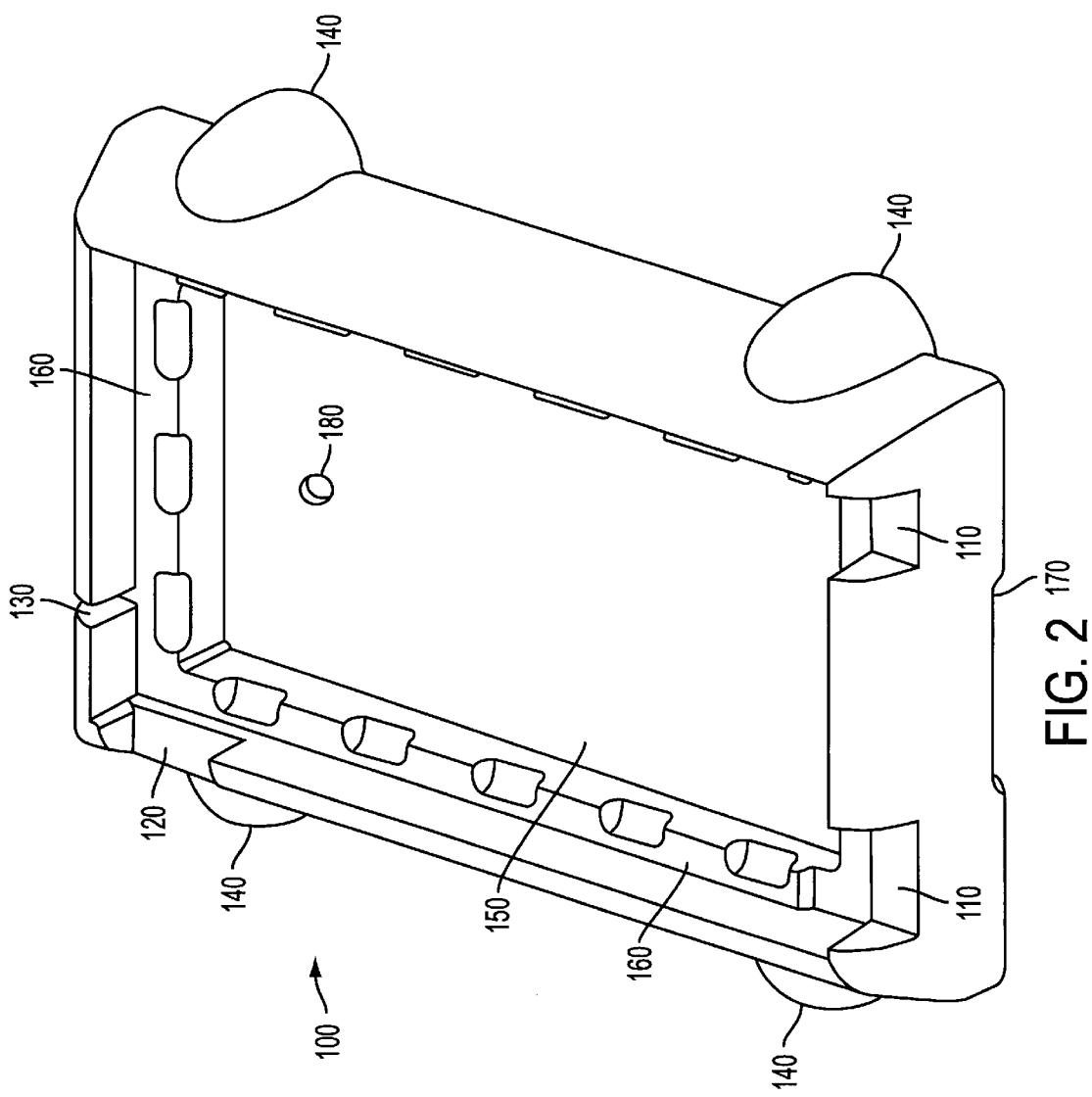
FIG. 2 is a perspective view of the base of the tile saw of FIG. 1.
Figure 3A:
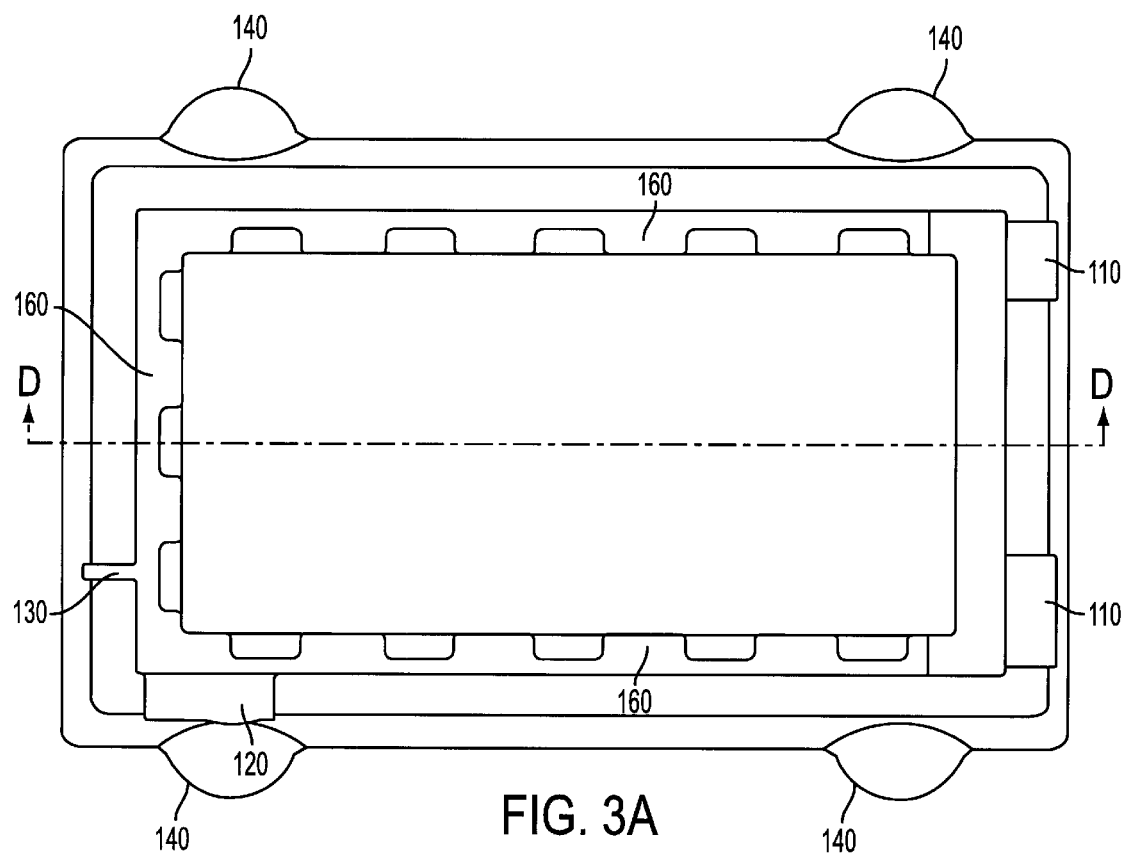
FIG. 3A is a top view of the base of FIG. 2.
Figure 3B:
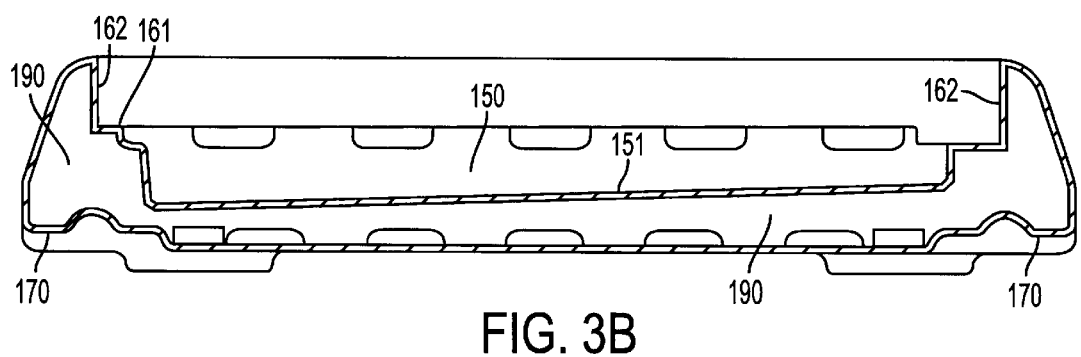
FIG. 3B is a sectional side view of the base taken along line D—D in FIG. 3A.

With reference to FIGS. 2 and 3, shelf 160 is formed on the interior perimeter of base 100. Shelf 160 provides a flat bottom surface 161 and a side surface 162 (see FIG. 3B) extending around the perimeter of base 100 for mating with and supporting frame assembly 300. Frame assembly 300 rests on shelf 160 and is held in place by flat bottom surface 161 and side surface 162. Although fasteners are not necessary, frame assembly 300 could be secured to base 100. Base 100 may also include slots 110 and 120, whose function will be explained later.

In a preferred embodiment, base 100 includes an integral reservoir 150 for collecting the cooling fluid which is typically used with the tile saw 10. Alternatively, reservoir 150 may be separate from base 100. As is best appreciated in the sectional view of FIG. 3B, the bottom 151 of reservoir 150 may be sloped to help direct the cooling fluid toward the cooling fluid pump 152 and ensure that there is an adequate supply of cooling fluid from which the pump may draw during the operation of tile saw 10. Drain hole 180 may be provided to drain cooling fluid from reservoir 150, and is preferably located so that bottom 151 slopes toward drain hole 180.

Slot 130 provides access to reservoir 150 for the power cord of the cooling fluid pump. Slot 130 may be formed adjacent shelf 160 so that when the frame assembly 300 is placed on top of shelf 160, the power cord is held in the slot and prevented from coming out of the slot. Protrusions 140 around the perimeter of base 100 add additional stability to base 100. The bottom surfaces of protrusions 140 may include recesses for securing the base 100 to corresponding protrusions extending from a folding stand assembly 600 (see FIGS. 12A and 12B). Handles 170 may be integrally formed in a surface of base 100 to facilitate carrying the base.

Also in its preferred embodiment, base 100 is a hollow, unitary component formed of a lightweight material such as high density polyethylene. Base 100 has an interior space 190 completely enclosed by the walls of base 100, as seen in FIG. 3B. This construction results in a rigid base, and may be accomplished through a blow molding process. Base 100 derives its rigidity in part from its increased resistance to bending due to the spaced apart walls which result from its hollow construction. Some known tile saws have utilized solid, vacuum formed plastic bases. While these bases have been lightweight, they are not as rigid as the base 100.

As mentioned previously, reservoir 150 may be separate from base 100, in which case the separate reservoir 150 may still be beneficially constructed as a unitary component with an enclosed interior space for rigidity as described above.

The rigidity of base 100 has several benefits. Since the remaining components of tile saw 10 are supported by base 100, the increased rigidity of base 100 results in increased stability of the entire saw. The increased rigidity of base 100 facilitates carrying the saw by the integrally formed handles. Also, the increased rigidity facilitates carrying the base while it contains cooling fluid to a location where the fluid can be expelled and the base cleaned.

Figure 6:
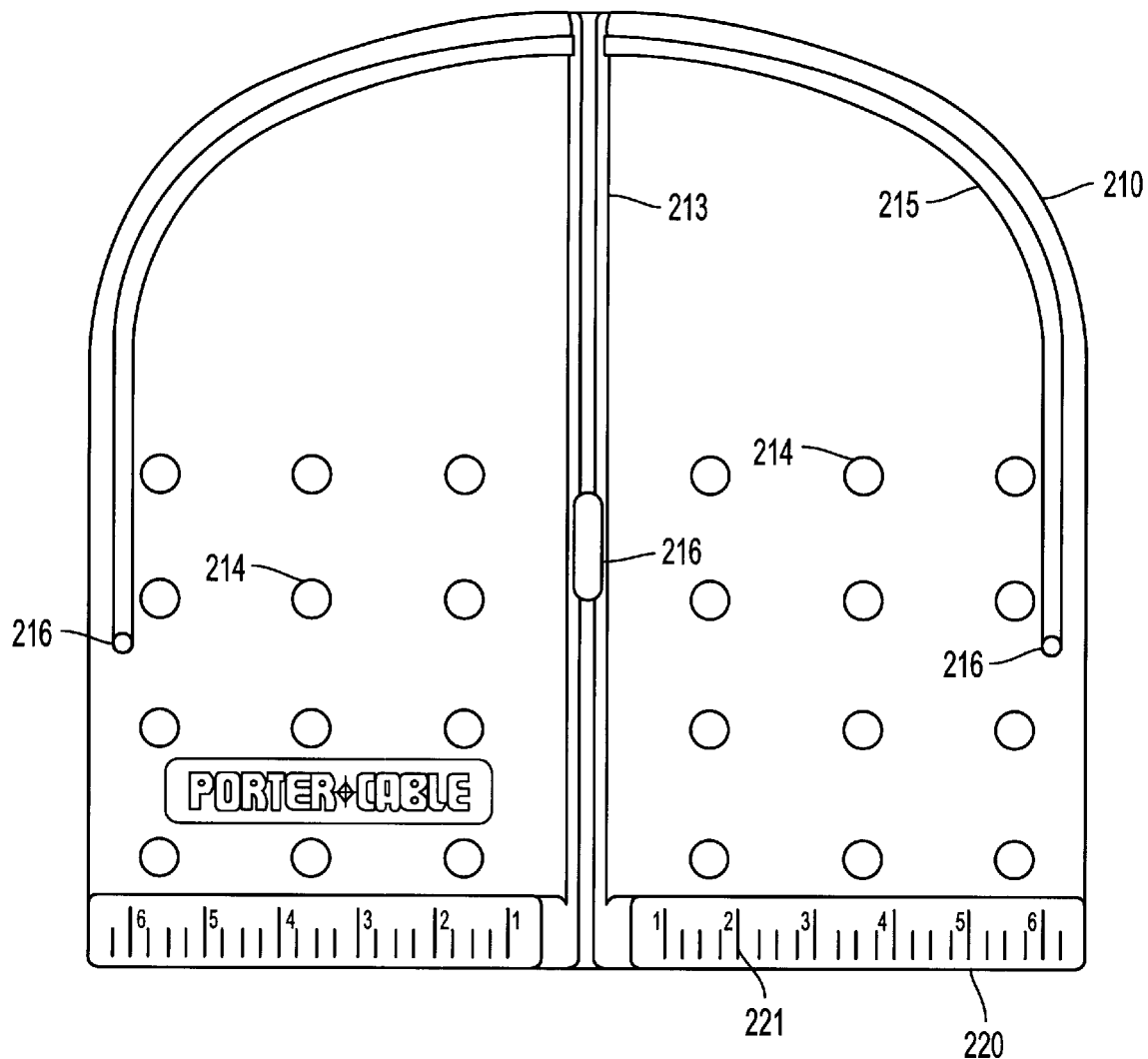
FIG. 6 is a top view of the table of the preferred embodiment.

With reference to FIGS. 4, 5, and 6, table assembly 200 includes a table 210. Table 210 supports the work piece during cutting and slides relative to the frame assembly 300. In order to slide relative to frame assembly 300, table assembly 200 includes bearings which allow relative motion between the two assemblies. The bearings may be a set of rollers or wheels, linear bearings, or any other device which facilitates relative motion between two structures. Many possible variations of table 210 which support the work piece and slide relative to the frame assembly 300 will be apparent to those of skill in the art, and are within the scope of the invention.

Table 210 provides an upper surface 211 and may also provide a back surface 212 preferably formed perpendicular to the upper surface 211. Generally flat tiles and other masonry work pieces may be laid on top of the upper surface 211 and abutted against the back surface 212 to facilitate pushing the work piece into the saw blade.

Table 210 may be formed of any material but is preferably formed of a lightweight material such as plastic. Table assembly 200 may include a fence 220 with indicia 221 for indicating the distance from an edge of a work piece to the cut. Fence 220 serves as a finger grip as well as provides a back surface 212 for supporting the work piece. An adjustable work stop 222 may be included. Preferably, adjustable work stop 222 removably attaches to the fence 220. Groove 213 may be formed on upper surface 212 and pass through fence 220 for allowing the saw blade to pass through upper surface 212 and fence 220 while cutting. Holes 214 help prevent cooling fluid from puddling on upper surface 210 by allowing the cooling fluid to pass through table 210 and return to reservoir 150 below. Perimeter groove 215 extends around a portion of the perimeter of each side of table 210 towards groove 213. Perimeter groove 215 channels cooling fluid away from the perimeter edges of table 210, where the cooling fluid could drip onto the roller assembly 280, toward the center of table 210 at groove 213. Holes 216 are specially formed in the bottom of groove 213 and perimeter groove 215 for allowing cooling fluid to pass through table 210.

Inner rails 230, 240 are attached to the underside of table 210 with screws 282 and washers 283. Screws 282 are received in bores 219 formed in bosses 218 which are integral with the underside of table 210. Bosses 218 extend slightly beyond and below the surrounding underside of table 210 to create a gap 217 (see FIGS. 5A and 8C) between the inner rails 230, 240 and the underside of table 210. Inner rails 230, 240 are preferably formed of metal, such as aluminum, to be stiffer than table 210 yet still relatively lightweight.

In a preferred embodiment, rolling support between the table and frame assemblies is provided by roller assembly 280 (see FIG. 4). Roller assembly 280 includes rollers 290 and 291. Two rollers 290 are mounted to inner rail 240 by shoulder screws 284. Two rollers 291 are mounted to inner rail 230 by shoulder screws 284, ball bearings 285, and spacers 286. Two additional rollers 292 are also mounted to each inner rail 230, 240 by shoulder screws 284 and spacers 286. Each of these rollers is mounted for rotational movement relative to table 210.

Figure 7:
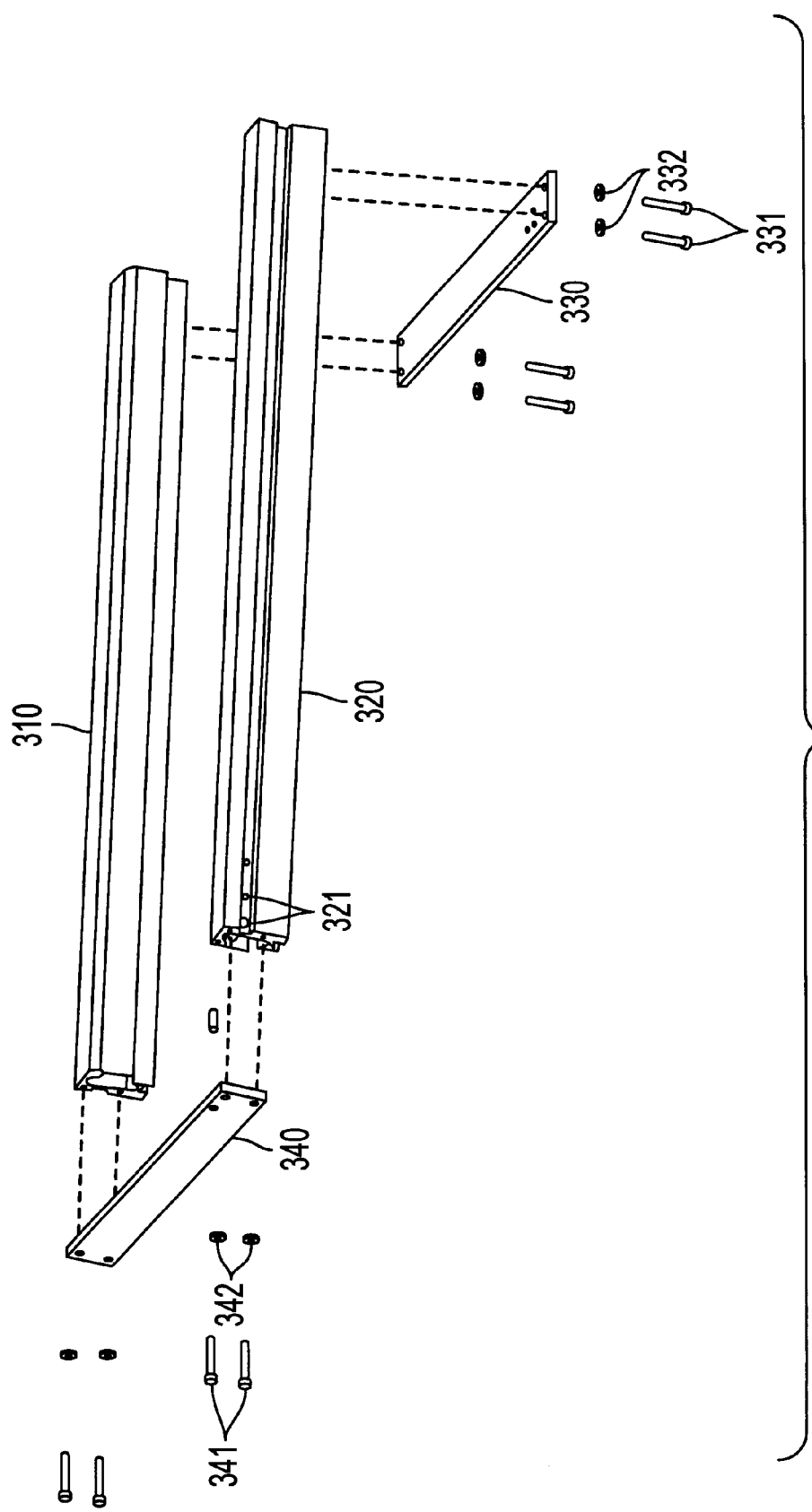
FIG. 7 is an exploded view of the frame assembly of the preferred embodiment.

With reference to FIGS. 7 and 8, the frame assembly 300 includes two outer rails 310, 320. The outer rails 310, 320 are elongated frame members which support the bearings of the table assembly for rolling or sliding movement.

Figure 8A:
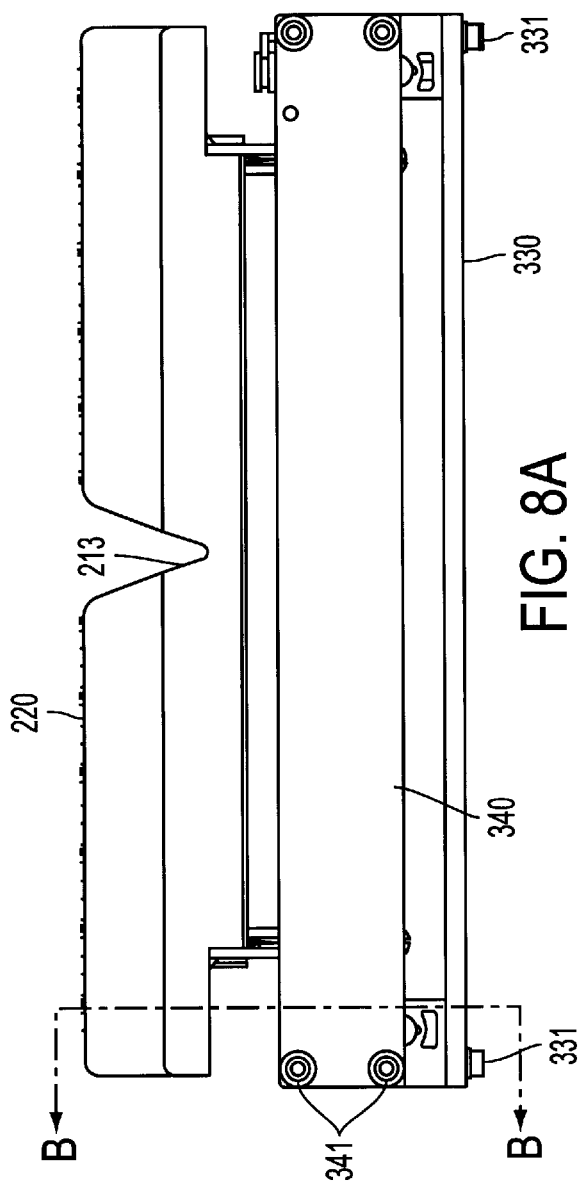
FIG. 8A is a front elevation view of the table assembly and frame assembly of the preferred embodiment.
Figure 8C:
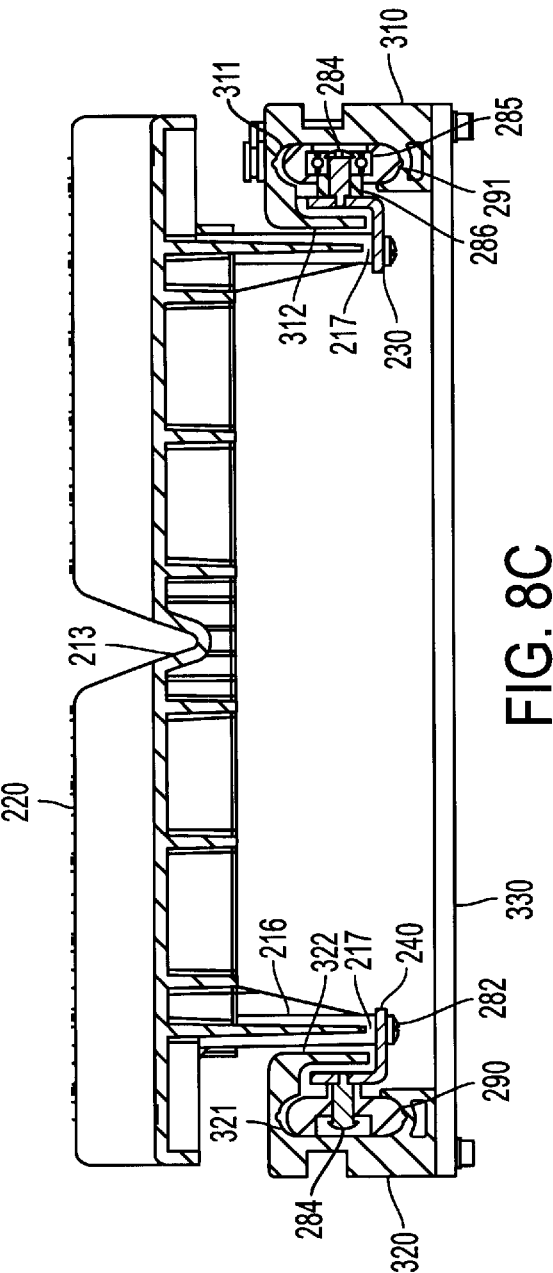
FIG. 8C is a rear sectional assembly view of the table assembly and frame assembly taken along line C—C in FIG. 8B.

In a preferred embodiment, each outer rail 310, 320 is an extrusion including a substantially enclosed track 311, 321 which has a cross-section generally matching and slightly larger than the profile of rollers 290 and 291 (see FIG. 8C). With tracks 311, 321 formed from the interior of outer rails 310, 320, the tracks 311, 321 are bound by the outer rails on the top and bottom and on at least one side. The tracks 311, 321 are further enclosed by downwardly extending lips 312, 322, respectively, which may be integrally formed on rails 310, 320. Downwardly extending lips 312, 322 shield the openings to the tracks 311, 321.

Outer rails 310, 320 are arranged in the frame assembly 300 to be parallel and spaced apart by a bottom rail 330 and an end rail 340. End rail 340 is attached at each of its ends to a first respective end of outer rails 310, 320. Bottom rail 330 is attached at each of its ends to a respective bottom of outer rails 310, 320 in the vicinity of the second respective end of outer rails 310, 320. Screws 331, 341 and washers 332, 342 fasten the bottom rail 330 to the outer rails 310, 320, and the end rail 340 to the outer rails 310, 320, respectively. Together, the outer rails 310, 320, the bottom rail 330, and the end rail 340 form a generally rectangular frame.

With the construction of the preferred embodiment of outer rails 310, 320, rollers 290, 291 will roll inside of substantially enclosed tracks 311, 321 and very little cooling fluid will reach the tracks 311, 321 because of the tortuous path the cooling fluid is required to follow to reach the tracks 311, 321. With reference to FIG. 8C, in order to reach tracks 311 or 321, the cooling fluid would have to flow down from table 210, across the top of outer rail 310 or 320, then down in between the table assembly and the downwardly extending lip 312 or 322, then up against the force of gravity between lip 312 or 322 and inner rails 230 or 240, and finally into track 311 or 321. Very little, if any, cooling fluid reaches the tracks 311, 321 with this construction. Any cooling fluid which may begin this tortuous path to the tracks 311, 321 is more likely to fall out into the reservoir 150 before it reaches tracks 311, 321. The gaps 217 formed between table 210 and inner rails 230, 240 allow the cooling fluid to drain into reservoir 150. The cooling fluid is much more likely to flow through the gap 217 than it is to flow upwards, against the force of gravity, between the lips 312, 322 and the inner rails 230, 240.

With little, if any, cooling fluid reaching tracks 311, 321, there will be little settling of debris and minimized sludge deposits forming on or in the tracks. Thus, the table will slide smoothly, even after prolonged use.

The tolerances between rollers 290 and 291 and the inner rails 230, 240 directly affects the amount of lateral movement that table assembly 200 will have relative to frame assembly 300. Too much lateral movement between the frame assembly 300 and table assembly 200 will prevent accurate cuts from being made. To avoid this, the tolerances between rollers 291 and inner rail 230 are closely controlled. However, closely controlled tolerances cause the components to be more expensive to manufacture. Therefore, as a trade-off, while the tolerances between rollers 291 and inner rail 230 are preferably closely controlled, the tolerances between rollers 290 and the inner rail 240 may be relatively less closely controlled to minimize manufacturing expenses. To help control the tolerances between rollers 291 and inner rail 230, rollers 291 are mounted to inner rail 230 together with ball bearings 285 and spacers 286. Rollers 290 are not mounted with ball bearings or spacers. With this construction, the rollers 291 are guide rollers, while the rollers 290 are follower rollers.

Figure 8B:
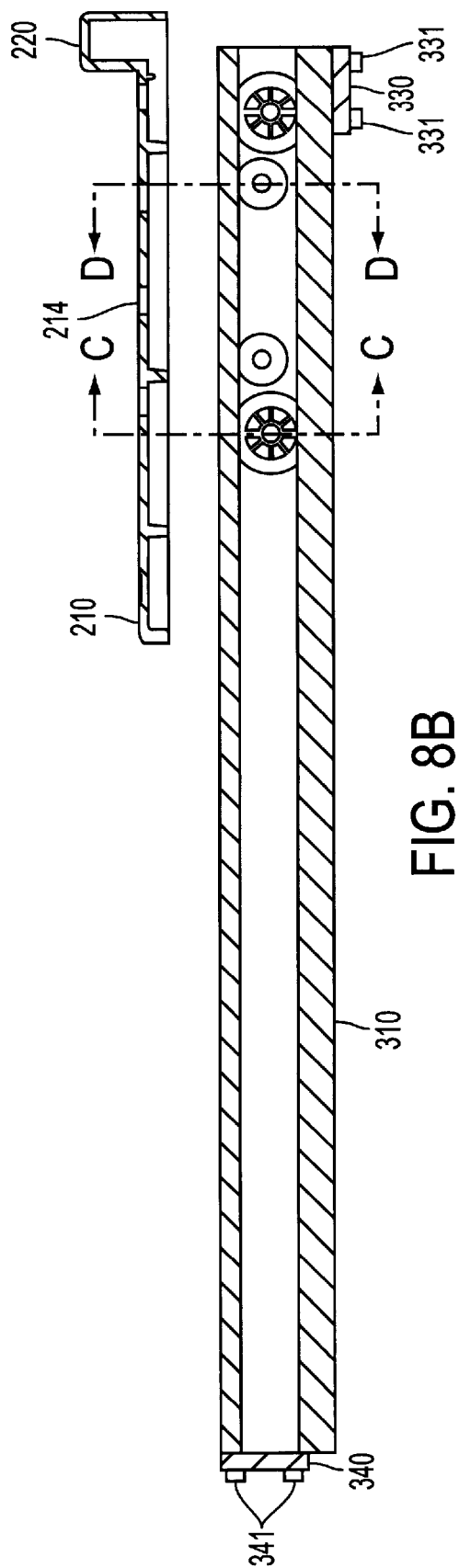
FIG. 8B is a side sectional assembly view of the table assembly and frame assembly taken along line B—B in FIG. 8A.
Figure 8D:
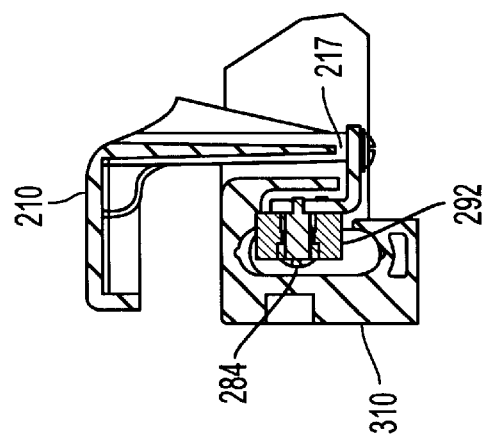
FIG. 8D is a detailed sectional assembly view of the table assembly and frame assembly taken along line D—D in FIG. 8B.

Rollers 292 are mounted to the inner rails in such a fashion that they will not roll in tracks 311, 321 as do rollers 290, 291, but will instead roll against a surface of the top portion of outer rails 310, 320 (see FIG. 8D). Rollers 292 also help to minimize the amount of unwanted movement between table assembly 200 and frame assembly 300, making the sliding action of the two assemblies relative to each other even smoother. Preferably, rollers 292 are somewhat resilient, and are mounted to the inner rails such that they push against the outer rails 310, 320 as they roll against a top portion thereof.

As best seen in FIGS. 8B and 8C, rollers 290, 291 are captured inside tracks 311, 321. This construction advantageously prevents table assembly 200 from tipping relative to tile saw 10. Table assembly 200 is constrained for sliding motion only, in a single direction, relative to tile saw 10, and is therefore relatively stable.

Even though rollers 290, 291 are captured inside of tracks 311, 321 and table assembly 200 is constrained for sliding movement in one direction only, the table assembly remains easily removable from tile saw 10. As best seen in FIGS. 8B and 8C, while end rail 340 prevents rollers 290, 291 from exiting tracks 311, 321 at one end of outer rails 310, 320, bottom rail 330 does not prevent the rollers from exiting the tracks at the other end of the outer rails. The user may push table assembly 200 toward the end of frame assembly 300 and bottom rail 330 until each of the rollers 290, 291 exits tracks 311, 321. When rollers 290, 291 exit tracks 311, 321, the table assembly 200 is no longer connected in any way to tile saw 10.

Figure 9C:
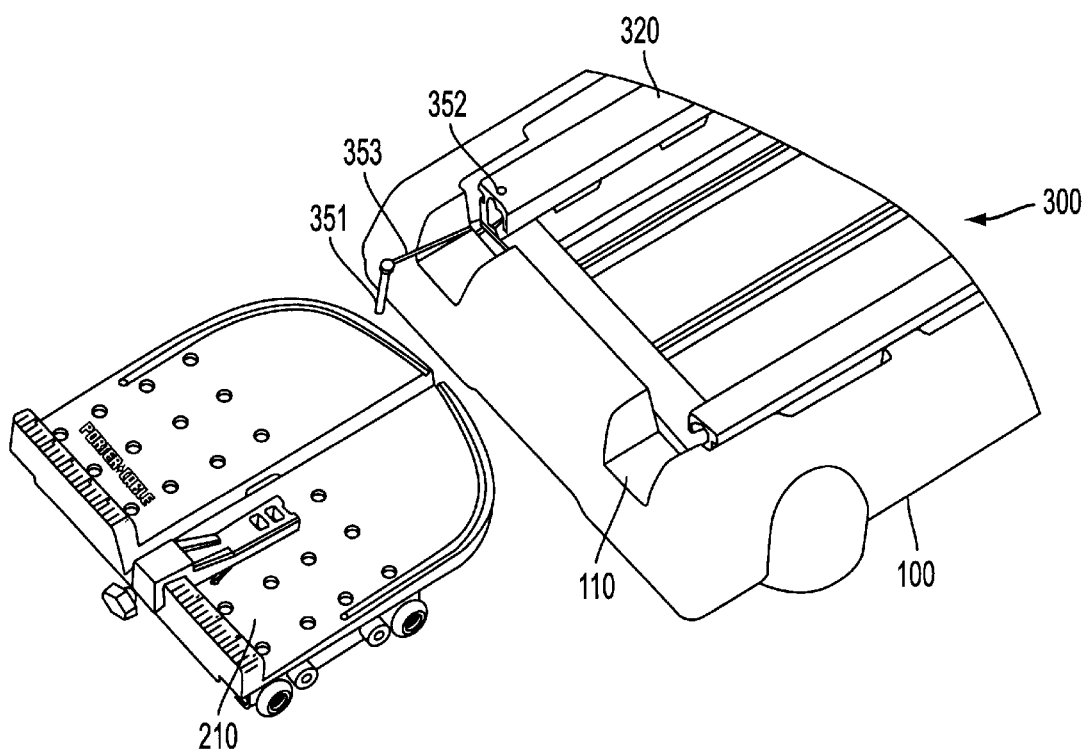
FIGS. 9A, 9B, and 9C are perspective detail views of the preferred embodiment of the tile saw illustrating the removal of the table from the tile saw.
Figure 9A:
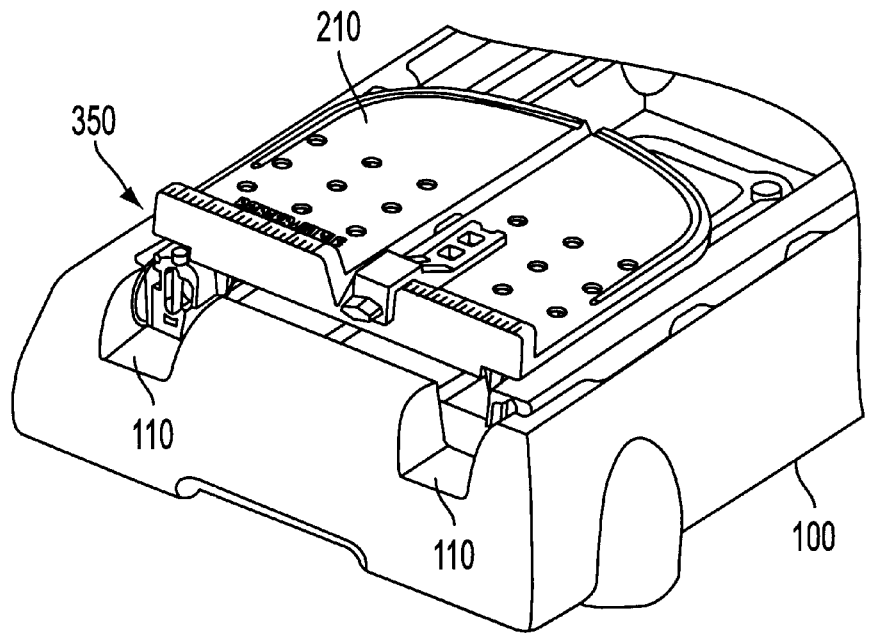
Figure 9B:
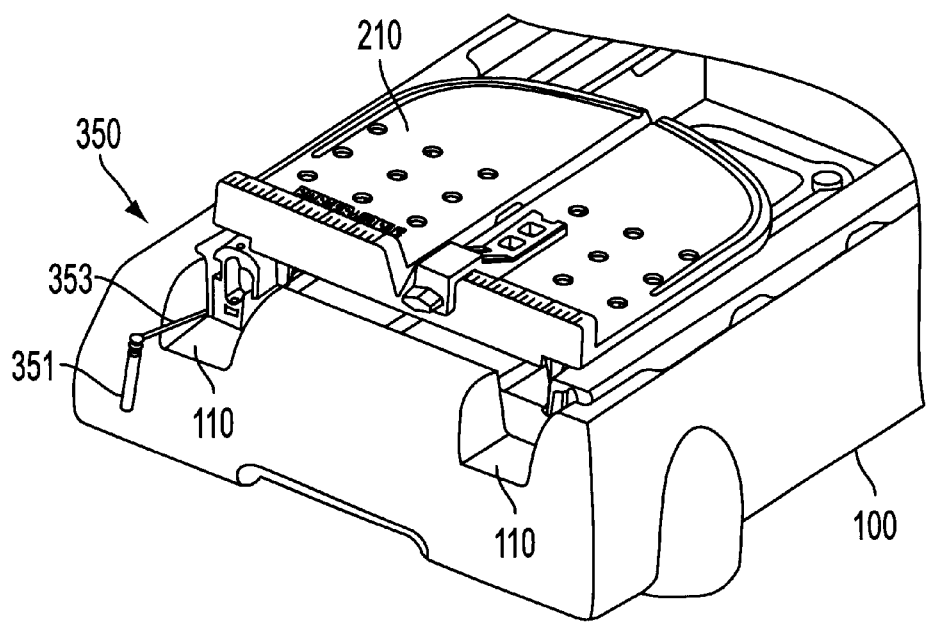

As best shown in FIG. 9, slots 110 are formed in base 100 to allow table assembly 200 to slide out of frame assembly 300 and not be blocked by base 100. Removal of table assembly 200 may be desirable to facilitate cleaning tile saw 10.

A locking assembly 350 is provided to lock the table assembly 200 onto the frame assembly 300. When the locking assembly 350 is in a locked position, table assembly 200 may slide relative to frame assembly 300, but may not become completely detached from frame assembly 300. When the locking assembly 350 is in an unlocked position, table assembly 200 may slide relative to frame assembly 300, and may become completely detached from frame assembly 300. Many different locking assemblies known in the art may be used.

In a preferred embodiment, locking assembly 350 includes a locking pin 351. When locking pin 351 is inserted into bore 352, it blocks the rollers of the table assembly 200 from passing through the opening in the end of outer rail 320 (see FIG. 9A). Locking pin 351 may be removed from bore 352, but remains flexibly attached to outer rail 320 through lanyard 353 to prevent losing the pin 351 (see FIG. 9B). When the locking pin 351 is removed, table 210 may be removed from frame assembly 300 (see FIG. 9C). Locking pin 351 may have provision for a friction fit with bore 352 to keep the pin in place during use of the saw.

Figure 10:
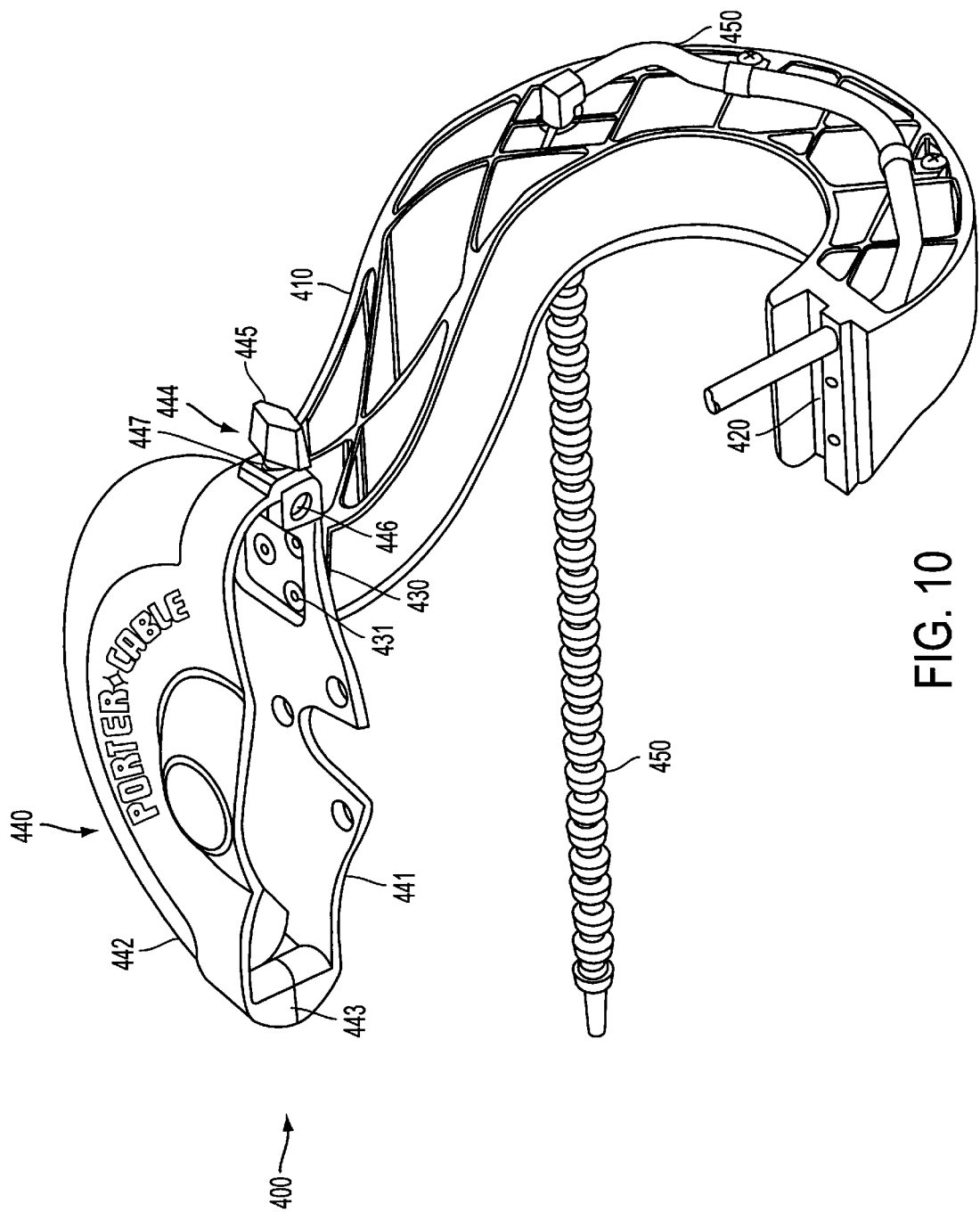
FIG. 10 is a perspective view of the arm assembly of the preferred embodiment of the tile saw.

With reference to FIG. 10, the arm assembly 400 includes arm 410 which is adapted to support saw 500 in a position above table assembly 200. The arm 410 may be of any design capable of supporting the saw 500. In a preferred embodiment, arm 410 is a unitary component constructed of cast metal, such as aluminum. Arm 410 includes a mating surface 420 at one end adapted to conform to the profile of outer rail 320. Outer rail 320 includes appropriate apertures 321 (see FIG. 7) for mounting arm 410 to outer rail 320 with fasteners (not shown). Slot 120 (see FIG. 2) formed in base 100 is adapted to allow arm 410 to be positioned next to outer rail 320 when the frame assembly 300 is set in the base 100. The other end of arm 410 includes a mating surface 430 adapted to receive back plate 441 of blade guard 440. Back plate 441 is attached to mating surface 430 by fasteners 431.

Blade guard 440 includes two major components, a back plate 441 and a front guard 442 hinged to back plate 431. Front guard 442 is hinged to back plate 441 at hinge 443. With the front guard hinged to the back plate, the front guard may be pivoted to one position where the blade is safely covered during use of tile saw 10, and to another position where the blade is more exposed to facilitate removal and changing of the blade.

Guard pivot clamp 444 holds front guard 442 in an operating position with respect to back plate 441 and arm 410, and can be released to allow front guard 442 to pivot to a blade access position. Guard pivot clamp 444 includes a thumbscrew 445 and a pivot clamp rod 446. Pivot clamp rod 446 is mounted in back plate 441 for pivotal movement along a pivot axis. Thumbscrew 445 is threaded into pivot clamp rod 446 along a second axis perpendicular to the pivot axis. Together, thumbscrew 445 and pivot clamp rod 446 may pivot between an open and a closed position of guard pivot clamp 444. The closed position is illustrated in FIG. 11A. In the closed position, thumbscrew 445 is threaded by the user's fingers into pivot clamp rod 446 so that a portion of thumbscrew 445 clamps against an aperture 447 (see FIG. 11C) formed in front guard 442 and holds front guard 442 in place. The open position is illustrated in FIG. 11B. In the open position, thumbscrew 445 is threaded by the user's fingers slightly out of pivot clamp rod 446 so that the portion of thumbscrew 445 previously clamping front guard 442 is released. Thumbscrew 445 and pivot clamp rod 446 are then pivoted together to the open position depicted in FIG. 11B, where thumbscrew 445 no longer engages aperture 447. With the guard pivot clamp 444 in this position, the front guard 442 is free to rotate to its blade access position, shown in FIG. 11C.

Cooling hose 450 is adapted to channel cooling fluid from the reservoir 150. A pump positioned in the reservoir draws the cooling fluid and pumps it into hose 450. Hose 450 is also adapted to channel the cooling fluid onto the blade and the cut during cutting with the tile saw 10. To this end, hose 450 may include a positionable member portion allowing the user to direct the flow of fluid onto the cut as desired (see FIG. 10), or hose 450 may lead to a nozzle situated inside of front guard 442 and back plate 441 to direct fluid always onto the saw blade (see FIG. 1).

Figure 11C:
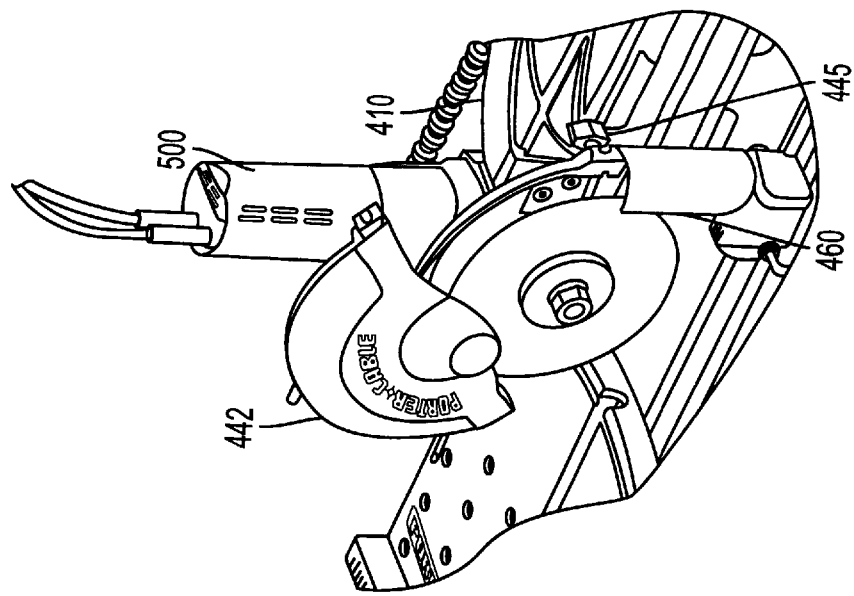
FIGS. 11A, 11B, and 11C are perspective detail views of the preferred embodiment of the tile saw illustrating the pivoting of the blade guard.
Figure 11B:
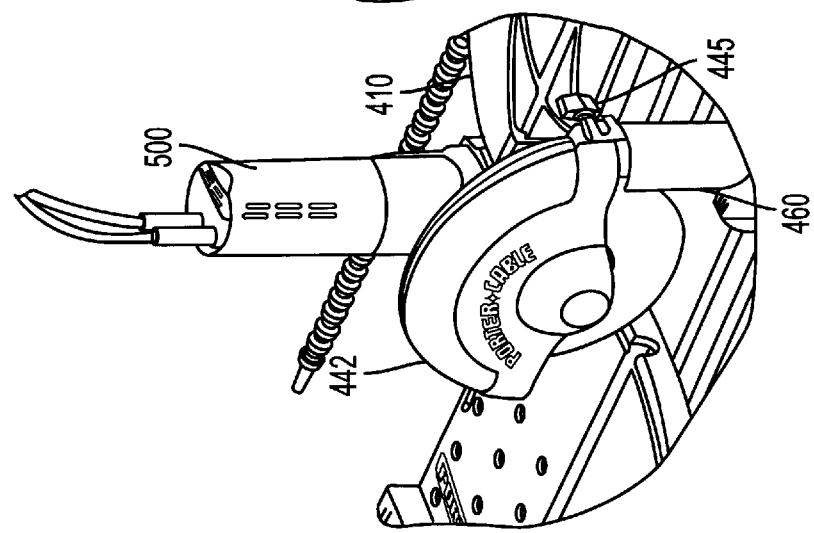
Figure 11A:
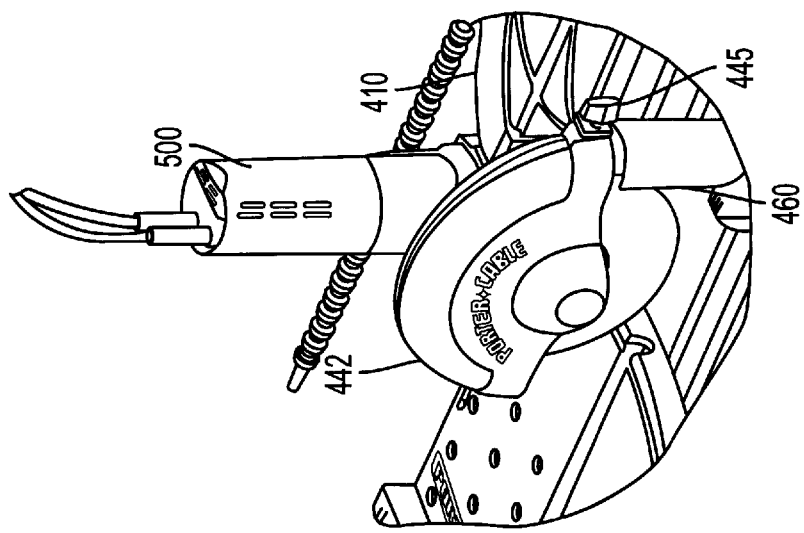

A splash guard 460 may be fastened to back plate 441, as shown in FIGS. 11A–11C. Splash guard 460 collects droplets of cooling fluid which are thrown off of the blade during cutting and directs them into the reservoir 150 to prevent them from being thrown off of tile saw 10.

Saw assembly 500 is attached to back plate 441. Saw assembly 500 is positioned such that a saw shaft extends between back plate 441 and front guard 442. A saw blade is attached to the saw shaft and is positioned between back plate 441 and front guard 442.

Figure 12B:
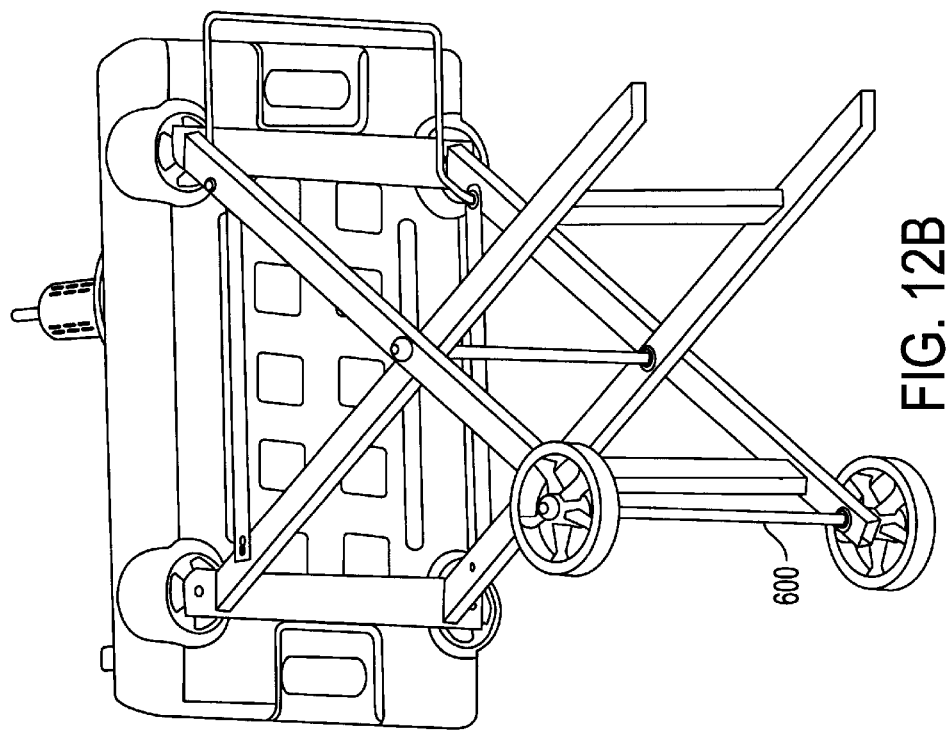
FIGS. 12A and 12B are perspective views of the tile saw of the preferred embodiment including a detachable stand.
Figure 12A:
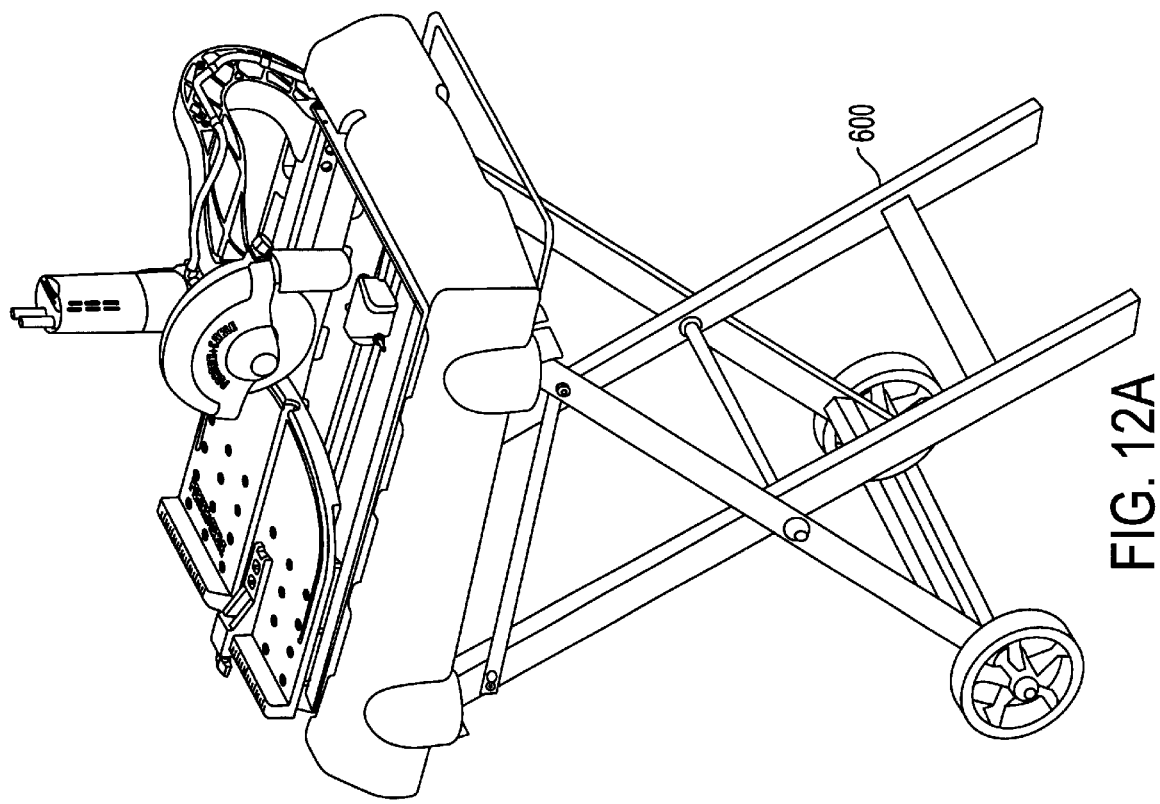

As shown in FIGS. 12A and 12B, a preferred embodiment may include a folding stand assembly 600. Folding stand assembly 600 may be provided with wheels to facilitate moving tile saw 10 from one location to another. Folding stand assembly 600 includes protrusions which extend from the stand and engage base 100 in apertures formed in the underside of protrusions 140. With this construction, tile saw 10 may be removably set on folding stand assembly 600 to support the saw in a comfortable position during use, and to facilitate transporting the saw.

Although the invention has been described in connection with the preferred embodiments, these embodiments are intended to be illustrative only. Additional advantages and modifications will readily occur to those skilled in the art. The invention in its broader aspects is not limited to the specific details of the representative device shown and described herein. Rather, various modifications may be made without departing from the spirit and scope of the invention as defined by the appended claims.

We claim:

1. A tile saw comprising:

a base;

a frame supported by the base, the frame comprising a pair of rails, each rail having a substantially enclosed track;

a reservoir positioned below at least a portion of the frame and having a pump for moving a fluid out of the reservoir;

a table with a top surface for supporting a work piece;

bearings operatively coupled to the table, wherein each of the bearings is mounted in the substantially enclosed tracks of the rails of the frame so that the table may slide relative to the frame;

an arm mounted to one of the frame or the base;

a saw secured on the arm and positioned above the table so that when the table slides relative to the frame, a work piece positioned on the table can be cut by the saw.

2. The tile saw according to claim 1:

wherein each of the bearings comprises rollers with an outer profile; and each of the tracks has a profile which substantially corresponds to the outer profile of the rollers.

3. The tile saw according to claim 1:

wherein fluid which leaves the reservoir through the pump and falls from above the table toward the reservoir will have to flow against the force of gravity at least once in order to reach the tracks.

4. The tile saw according to claim 1:

wherein the rails define a serpentine flow path so that fluid which leaves the reservoir through the pump and falls from above the table toward the reservoir will have to follow the serpentine flow path in order to reach the tracks.

5. A sliding table and track assembly for a tile saw comprising:

a table with bearings;

a first rail and a second rail fixed together and spaced apart parallel to one another;

a first track formed in the first rail and a second track formed in the second rail, wherein each of the bearings of the table is supported on one of the first or second tracks such that the table may slide relative to the rails; and wherein the track is surrounded by the rail on at least three sides so that when the bearings are supported on the tracks the bearings are substantially enclosed by the rails for at least partially preventing a fluid from reaching the tracks.

6. The sliding table and track assembly for a tile saw according to claim 5:

wherein the bearings comprise rollers with an outer profile and the profile of the tracks substantially corresponds with the outer profile of the rollers.

7. The sliding table and track assembly for a tile saw according to claim 6:

wherein the bearings are secured within the enclosed tracks in any angular orientation of the sliding table and track assembly.

8. The sliding table and track assembly for a tile saw according to claim 6:

wherein each of the rollers is mounted on a separate fastener, each of the fasteners is attached to one of a pair of inner rails, and each of the inner rails is fastened to the table such that a gap is formed between a bottom surface of the table and each of the inner rails.

9. The sliding table and track assembly for a tile saw according to claim 8 further comprising:

a first downwardly extending lip associated with the first rail and a second downwardly extending lip associated with the second rail;

wherein each of the fasteners passes through an opening formed in each of the rails leading to the tracks; and wherein each of the downwardly extending lips partially shields the openings.

10. The sliding table and track assembly for a tile saw according to claim 9:

wherein each track is an extrusion and the track and the downwardly extending lip associated with each rail are integrally formed with the rail.

11. A tile saw comprising:

a frame comprising a pair of rails;

a table operatively attached to a set of bearings, each bearing supported by one of the rails of the frame so that the movement of the table is constrained to translational movement in one direction only relative to the frame;

an arm mounted to the frame; and a saw mounted to the arm and positioned above the table so that when the table slides relative to the frame, a work piece positioned on the table can be cut by the saw.

12. The tile saw according to claim 11:

wherein at least one of the bearings is a roller;

wherein at least one of the rails includes a track formed on the rail and the at least one roller is supported on the track; and wherein the track is bound by the rail on at least a top and a bottom of the track.

13. The tile saw according to claim 12:

wherein the at least one roller has an outer profile and a profile of the track substantially corresponds to the outer profile of the at least one roller.

14. The tile saw according to claim 12 further comprising:
a locking assembly having a locked position and an unlocked position;
wherein when the locking assembly is in the locked position, the table may slide relative to the frame, but the table may not be removed from the frame, and when the locking assembly is in the unlocked position, the table may slide relative to the frame and may be removed from the frame.

15. The tile saw according to claim 14 further comprising:
a downwardly extending lip extending from each of the rails having a track formed on the rail, the downwardly extending lip partially shielding an opening to the track.

16. A tile saw comprising:
a frame comprising a pair of rails;
a table supported by the rails so that the table may slide relative to the frame;
an arm mounted to the frame;
a saw secured on the arm and positioned above the table so that when the table slides relative to the frame, a work piece positioned on the table can be cut by the saw; and
a reservoir below the frame for holding a fluid, the reservoir comprising an interior space completely enclosed by walls of the reservoir; and
a pump placed in the reservoir for removing a fluid from the reservoir.

17. The tile saw of claim 16:
wherein the frame is adapted to be removably placed on top of the reservoir, and the reservoir supports the frame.

18. The tile saw of claim 17:
wherein the reservoir further comprises a shelf, and the frame is adapted to be removably placed on the shelf.

19. The tile saw of claim 18:
wherein each of the rails includes a substantially enclosed track;
a set of rollers is operatively mounted on the table; and
each of the rollers is supported inside of one of the tracks so that the rollers ride inside of the tracks, and the table slides relative to the frame.

20. The tile saw of claim 16 further comprising:
handles integrally formed in a surface of the reservoir.

21. The tile saw of claim 16:
wherein a bottom surface of the reservoir is sloped toward the pump.

22. The tile saw of claim 16:
wherein a drain hole is formed on a bottom surface,
and the bottom surface is sloped toward the drain hole.

23. The tile saw of claim 16:
wherein the reservoir is constructed of a plastic material and is formed by a blow molding process.

24. A tile saw comprising:
a base
a frame supported by the base, the frame comprising a pair of rails;
a table having bearings operatively attached thereto, each bearing detachably supported by one of the rails so that the table may slide relative to the frame;
an arm mounted to one of the base or the frame;
a saw mounted to the arm and positioned above the table so that when the table slides relative to the frame, a work piece positioned on the table can be cut by the saw; and a locking assembly having a locked position and an unlocked position;
wherein when the locking assembly is in the locked position, the table may slide relative to the frame, but the table may not be removed from the frame, and when the locking assembly is in the unlocked position, the table may slide relative to the frame and the table may be removed from the frame.

25. The tile saw according to claim 24:
the locking assembly comprising a locking pin insertable into a portion of the frame for blocking removal of the table from the frame and flexibly attached to the frame by a lanyard.

26. A saw comprising:
a frame comprising a pair of rails;
a table supported by the frame so that the table may slide relative to the frame;
an arm mounted at a first end to the frame;
a saw mounted to a second end of the arm and positioned above the table so that when the table slides relative to the frame, a work piece positioned on the table can be cut by the saw;
a reservoir positioned below at least a portion of the frame for collecting a fluid;
a pump positioned in the reservoir, including a power cord; and
a slot formed in a side of the reservoir, the slot adapted to receive the power cord.

27. The saw according to claim 27:
wherein the power cord is removable from the slot.

28. The saw according to claim 27:
wherein the reservoir is provided with a shelf for supporting the frame, and the frame is adapted to be removably placed on top of the reservoir to rest upon the shelf; and
wherein the slot is formed in the reservoir adjacent to the shelf, and when the frame is placed on top of the reservoir the frame holds the cord in place and prevents the cord from being removed from the slot.

29. A tile saw comprising:
a base including recesses in a bottom surface of the base;
a frame supported by the base, the frame comprising a pair of rails;
a table having bearings operatively attached thereto, each bearing supported by one of the rails so that the table may slide relative to the frame;
an arm mounted to one of the base or the frame;
a saw mounted to the arm and positioned above the table so that when the table slides relative to the frame, a work piece positioned on the table can be cut by the saw;
a collapsible stand having protrusions extending from the stand, the protrusions engaging the recesses of the base to removably secure the stand to the base.

30. The tile saw according to claim 29 further comprising:
at least one set of wheels operatively attached to the stand.

31. A tile saw comprising:
a frame comprising a left rail and a right rail, each rail having a separate substantially enclosed track;
a reservoir positioned below at least a portion of the frame having a pump for moving a fluid out of the reservoir;
a table with a top surface for supporting a work piece and a left and a right side;

at least two left side rollers rotatably attached to the left side of the table, and at least two right side rollers rotatably attached to the right side of the table, wherein each of the rollers is mounted in one of the substantially enclosed tracks of the rails of the frame so that the table may slide relative to the frame, and wherein the at least two left side rollers are adapted to be mounted to the table so that the axial tolerance between at least one of the two left side rollers and the table is smaller than the axial tolerance between at least one of the at least two right side rollers and the table, an arm mounted to the frame;

a saw secured on the arm and positioned above the table so that when the table slides relative to the frame, a work piece positioned on the table can be cut by the saw.

32. The tile saw according to claim 31, wherein each of the rollers has an outer profile and the substantially enclosed tracks have a profile which corresponds with the outer profile of the rollers.

33. The tile saw according to claim 31 further comprising:

an additional left side roller rotatably attached to the left side of the table and an additional right side roller rotatably attached to the right side of the table, wherein the additional left side roller is configured to roll against a surface of a top portion of the left rail, and the additional right side roller is configured to roll against a surface of a top portion of the right rail.

34. The tile saw according to claim 33, wherein each of the at least two left side rollers are rotatably attached to the table using separate ball bearings.

35. A tile saw comprising:

a frame comprising a left rail and a right rail, each rail having a separate track;

a table with a top surface for supporting a work piece and having a left and a right side;

at least two left side rollers rotatably attached to the left side of the table, each of the at least two left side rollers being mounted to ride in the track of the left rail of the frame so that the table may slide relative to the frame;

an additional resilient left side roller rotatably attached to the left side of the table, the additional left side roller adapted to roll against a surface of a top portion of the left rail such that the additional resilient left side roller pushes against the surface of the top portion of the left rail;

an arm mounted to the frame; and a saw secured on the arm and positioned above the table so that when the table slides relative to the frame, a work piece positioned on the table can be cut by the saw.

36. The tile saw according to claim 35 further comprising:

at least two right side rollers rotatably attached to the right side of the table, each of the at least two right side rollers being mounted to ride in the track of the right rail of the frame so that the table may slide relative to the frame; and an additional resilient right side roller rotatably attached to the right side of the table, the additional right side roller adapted to roll against a surface of a top portion of the right rail such that the additional resilient right side roller pushes against the surface of the top portion of the right rail.

37. The tile saw according to claim 35, wherein each of the at least two left side rollers and each of the at least two right side rollers has an outer profile which corresponds to the profile of the tracks of the left and right side rails.

38. The tile saw according to claim 37, wherein the tolerance between the at least two left side rollers and the table is smaller than the tolerance between the at least two right side rollers and the table.

39. The tile saw according to claim 38, wherein each of the at least two left side rollers are rotatably attached to the table using separate ball bearings.

40. A tile saw comprising:

a frame comprising a pair of rails, each rail having a substantially enclosed track;

a reservoir positioned below at least a portion of the pair of rails and having a pump for moving a fluid out of the reservoir;

a table with a top surface for supporting a work piece;

bearings operatively coupled to the table, wherein each of the bearings is mounted in the substantially enclosed tracks of the rails of the frame so that the table may slide relative to the frame;

an arm mounted to the frame;

a saw secured on the arm and positioned above the table so that when the table slides relative to the frame, a work piece positioned on the table can be cut by the saw.

41. The tile saw according to claim 40:

wherein fluid which leaves the reservoir through the pump and falls from above the table toward the reservoir will have to flow against the force of gravity at least once in order to reach the tracks.

42. The tile saw according to claim 40:

wherein the table is constrained to translational movement in one direction only relative to the frame.

43. The tile saw according to claim 42 further comprising:

a locking assembly having at least a locked position and an unlocked position; and wherein when the locking assembly is in the locked position, the table may slide relative to the frame, but the table may not be removed from the frame, and when the locking assembly is in the unlocked position, the table may slide relative to the frame and may be removed from the frame.

* * * * *